US011165466B2

(12) United States Patent
Guidi et al.

(10) Patent No.: US 11,165,466 B2
(45) Date of Patent: Nov. 2, 2021

(54) WEARABLE DEVICE WITH INTEGRATED RFID OR NFC CHIPSET

(71) Applicant: GUIDI FRANCESCO S.R.L.U., Castelnuovo di Garfagnana (IT)

(72) Inventors: Francesco Guidi, Castelnuovo di Garfagnana (IT); Fabrizio Martinelli, Lucca (IT); Marco Magnarosa, Fiesole (IT); Alessandro Scata', Pisa (IT)

(73) Assignee: GUIDI FRANCESCO S.R.L.U., Castelnuovo di Garfagnana (IT)

( * ) Notice: Subject to any disclaimer, the term of this patent is extended or adjusted under 35 U.S.C. 154(b) by 440 days.

(21) Appl. No.: 16/098,751

(22) PCT Filed: May 2, 2017

(86) PCT No.: PCT/IT2017/000091
§ 371 (c)(1),
(2) Date: Nov. 2, 2018

(87) PCT Pub. No.: WO2017/191663
PCT Pub. Date: Nov. 9, 2017

(65) Prior Publication Data
US 2020/0266975 A1 Aug. 20, 2020

(30) Foreign Application Priority Data

May 4, 2016 (IT) ........................ 102016000045680

(51) Int. Cl.
*H04B 5/00* (2006.01)
*H04W 4/80* (2018.01)
(Continued)

(52) U.S. Cl.
CPC ....... *H04B 5/0081* (2013.01); *G06K 19/0723* (2013.01); *H04B 5/0031* (2013.01);
(Continued)

(58) Field of Classification Search
None
See application file for complete search history.

(56) References Cited

U.S. PATENT DOCUMENTS 6,431,455 B1 * 8/2002 Ponert ................. G06K 19/073
235/492
7,098,794 B2 8/2006 Lindsay et al.
(Continued)

FOREIGN PATENT DOCUMENTS

EP 2209100 A2 7/2010
WO 2014/096928 A1 6/2014

OTHER PUBLICATIONS

International Search Report and Written Opinion, dated Sep. 8, 2017, from corresponding PCT application No. PCT/IT2017/000091.

*Primary Examiner* — Gennadiy Tsvey
(74) *Attorney, Agent, or Firm* — Nixon & Vanderhye

(57) ABSTRACT

A wearable device with integrated RFID or NFC chipset, includes: a microchip for management and encryption of radio-frequency communications in RFID or NFC standards; at least one antenna, including metal coils to transmit/receive signals in RFID or NFC standards and/or metal coils to generate the electric current required for operation; a memory chip for storing data and encryption keys, manageable by the microchip; a wearable object, integrating the components of the device; a reversible closing buckle for the wearable object, associated with the opposite ends of the coils of the antenna. The buckle can determine in the coils a point of discontinuity, capable of reversibly inhibiting the respective transmission/reception functions of signals in RFID or NFC standards and of generating electric current via electromagnetic induction, thereby preventing unauthor- (Continued)

ized transmission by the microchip of the data and of the encryption keys of the same, contained in the memory chip.

9 Claims, 1 Drawing Sheet

(51) Int. Cl.
  *G06K 19/07* (2006.01)
  *H04L 9/08* (2006.01)
  *G06Q 50/26* (2012.01)
(52) U.S. Cl.
  CPC ........... *H04B 5/0062* (2013.01); *H04L 9/088* (2013.01); *H04W 4/80* (2018.02); *G06Q 50/265* (2013.01)

(56) References Cited

U.S. PATENT DOCUMENTS

| | | | |
|---|---|---|---|
| 7,323,998 B2* | 1/2008 | Girvin | G06K 19/0739 340/568.2 |
| 7,701,346 B2 | 4/2010 | Lindsay et al. | |
| 8,138,922 B2 | 3/2012 | Lindsay et al. | |
| 9,745,782 B2 | 8/2017 | Mubarak | |
| 2003/0085288 A1* | 5/2003 | Luu | H04W 88/02 235/492 |
| 2003/0173408 A1* | 9/2003 | Mosher, Jr. | G06K 19/07749 235/492 |
| 2005/0242957 A1* | 11/2005 | Lindsay | G06K 19/07345 340/572.7 |
| 2006/0084380 A1* | 4/2006 | Hoyt | H04B 5/02 455/41.1 |
| 2007/0008121 A1 | 1/2007 | Hart | |
| 2007/0115128 A1 | 5/2007 | Napolitano | |
| 2007/0120687 A1* | 5/2007 | Lerch | G06K 19/04 340/572.9 |
| 2008/0238632 A1* | 10/2008 | Endo | H04B 5/02 340/10.51 |
| 2009/0289762 A1* | 11/2009 | Tassy | G07C 9/257 340/5.83 |
| 2010/0136905 A1* | 6/2010 | Kristiansen | H04R 25/554 455/41.1 |
| 2011/0057042 A1* | 3/2011 | Duggan | G06K 19/07749 235/492 |
| 2014/0218196 A1 | 8/2014 | Londo et al. | |
| 2015/0161371 A1* | 6/2015 | Hoshi | G06F 21/35 726/19 |
| 2015/0312038 A1* | 10/2015 | Palanisamy | G06F 21/44 713/155 |
| 2015/0337564 A1* | 11/2015 | Mubarak | E05B 73/0005 340/542 |
| 2016/0125677 A1* | 5/2016 | Williams | G06F 1/1677 340/5.81 |
| 2016/0189136 A1* | 6/2016 | Mercilie | H04W 12/06 705/44 |
| 2017/0222692 A1* | 8/2017 | Huang | H04B 5/0081 |
| 2018/0294844 A1* | 10/2018 | Choi | H01Q 1/273 |

* cited by examiner

WEARABLE DEVICE WITH INTEGRATED RFID OR NFC CHIPSET

TECHNICAL FIELD

The invention relates to the sector of communication devices with RFID (Radio Frequency Identification) or NFC (Near Field Communication) technology.

More in detail, the invention relates to a wearable device with integrated RFID or NFC chipset.

BACKGROUND ART

The initials RFID (Radio Frequency Identification) and NFC (Near Field Communication) identify radio frequency communication systems for short range communication of signals and data, based on the ability of specific electronic labels (Tags) to store data and to provide remote access thereto (in reading and/or writing) to particular interrogation apparatus (Readers) corresponding thereto.

RFID and NFC technologies allow the production of automated acquisition/storage systems of information concerning persons, objects or also animals (AIDC—Automatic Identification and Data Capture), and in particular of:
- individual identification systems (authorized access of personnel and/or vehicles, controlling the presence of personnel in the workplace, electronic identity documents, etc.);
- secure electronic purchase and payment systems (electronic ticketing for means of transport and events, bank cards, etc.);
- logistic management systems for industrial and commercial activities (unique identification of products, automated control of stock, etc.);
- tracking systems for goods of various kinds;
- tracking systems for livestock for food or domestic use;
- tracking systems for bureaucratic procedures;
- monitoring systems for solid urban waste collections;
- alarm/anti-theft/anti-shoplifting systems.

Regardless of the function performed, an RFID or NFC system substantially comprises:
- a plurality of electronic labels (Tags), containing data relating to the specific function performed by the same system;
- a fixed or portable interrogation apparatus (Reader) of said electronic labels (Tag);
- an information system for the management of data accessible by said interrogation apparatus (Reader).

In an RFID or NFC system, transmission of the data concerned from the Tags to the corresponding Reader occurs automatically, as direct consequence of interrogation of the Tags by the same Reader.

This prerogative represents a limit to the use of RFID or NFC systems in services that require the transmission of confidential data, as:
- the absence of authentication procedures between Tag and Reader, executed at hardware level, can facilitate interception of the data transmitted and their possible use in fraudulent activities (identity theft, unauthorized access to banking services and the like, etc.);
- the absence of control procedures on the Tags, executed at hardware level, can enable their unauthorized use after being stolen from the legitimate owners and their consequent use for fraudulent access to goods and services belonging to others;
- the absence of encryption techniques, applied to transmissions taking place between Tag and Reader, can facilitate implementation of the aforesaid fraudulent actions.

PRESENTATION OF THE INVENTION

The object of the present invention is to overcome the aforesaid negative aspects concerning the limited levels of security currently offered by RFID and NFC systems.

The object of the invention is achieved with a wearable device with integrated RFID or NFC chipset, according to the main independent claim 1.

Further characteristics of the invention are contained in the dependent claims.

Advantages of the Invention

The invention produces the following important advantages:
- it allows integration of Tags of RFID or NFC systems in wearable objects such as bracelets, watches, necklaces, belts, etc.;
- it allows preliminary activation of said Tags, via identification codes and encryption keys, uniquely associated with the individual users of said RFID or NFC systems;
- it allows transmission of said identification codes and said encryption keys to said Tags, via portable (smartphones, tablets, etc.) or fixed (personal computers) electronic devices physically or remotely connectable thereto;
- it allows preliminary deactivation of said Tags, following opening of the buckle of the objects in which said Tags are integrated;
- it allows the identity of users of RFID or NFC systems to be verified, via the identification codes uniquely associated with the Tags of the same systems;
- it allows implementation of encrypted transmissions between Tags and Readers of RFID or NFC systems;
- it allows, at hardware level, separation of the cryptographic algorithms and of the encryption keys utilized to generate said encrypted transmissions.

BRIEF DESCRIPTION OF THE DRAWINGS

Further features and advantages of the invention will be more evident from the more detailed description set forth below, with the aid of the drawings, which show a preferred implementation thereof, illustrated by way of non-limiting example, wherein.

MODE OF IMPLEMENTATION OF THE INVENTION

Figure 1:
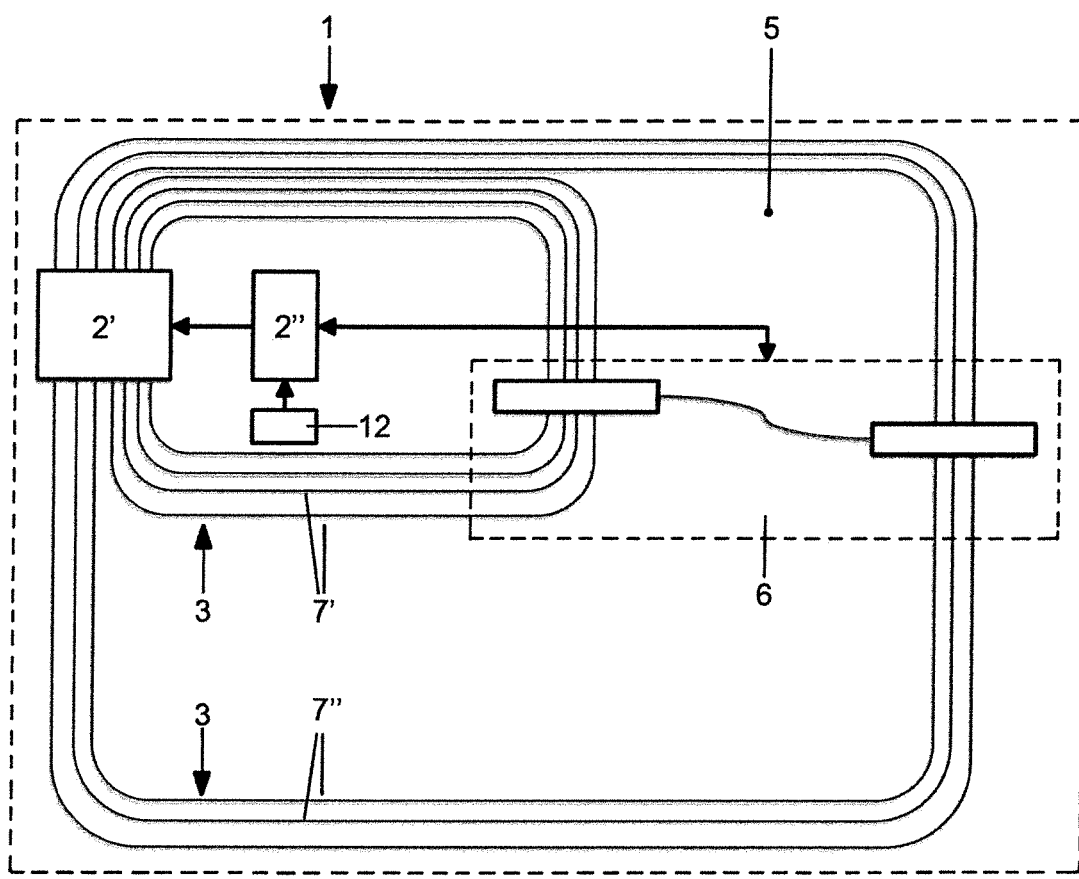
FIG. 1 schematically shows the structure of a wearable device with integrated RFID or NFC chipset according to the invention.
Figure 2:
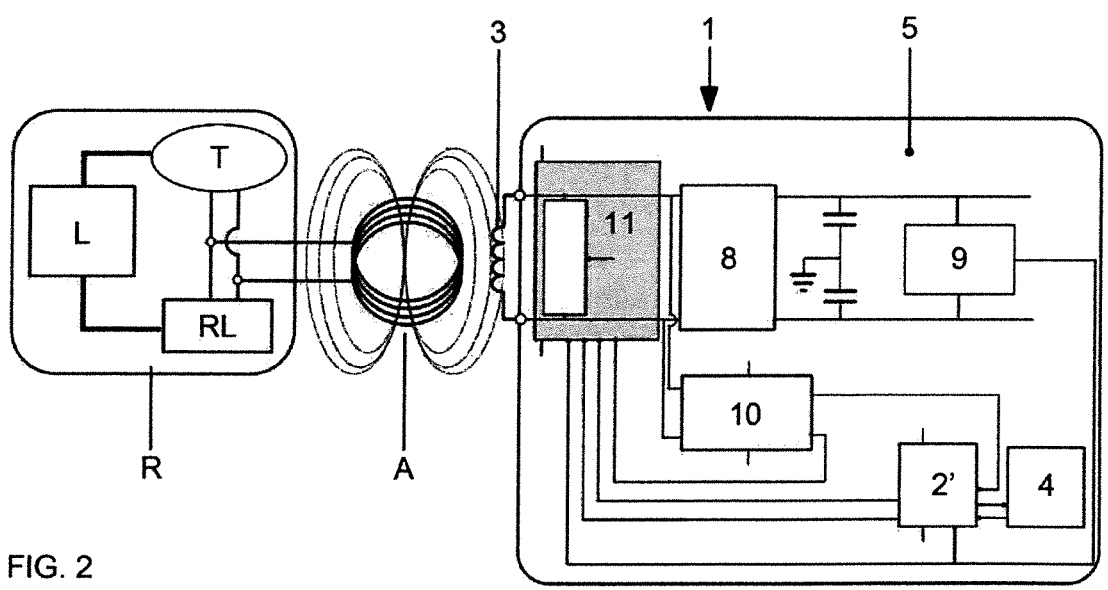
FIG. 2 schematically shows the operating logic of said device.

With reference to the details of FIGS. 1-2, a wearable device 1 with integrated RFID or NFC chipset according to the invention substantially comprises:
- a microchip 2' for management and encryption of radio-frequency communications in RFID or NFC standards, associated with a least one antenna 3 for transmission/reception of signals in these standards;

a memory chip 4, adapted to contain data and encryption keys of the same, personal for the user of the device 1, manageable by said microchip 2', a wearable object 5, integrating the components of the device 1;

a reversible closing buckle 6 for said wearable object 5;

a microchip 2" for detection of the condition of opening of said buckle 6 and consequent deactivation of the microchip 2', associated with its own power supply means 12.

The device 1 as described is capable of operating as a passive Tag in relation to Readers R of RFID or NFC systems, preferably but not exclusively on HF frequencies (for example 13.56 MHz).

The microchip 2' is adapted to be activated via identification codes (pins, random keys, etc.) and encryption keys, unique for the user of the device 1, transmitted via a multiplatform software application, executable on portable (smartphones, tablets, etc.) or fixed (personal computers) electronic devices, connectable to the device 1 via physical (usb, etc.) or remote (Wi-Fi, Bluetooth, etc.) interfaces.

The antenna 3 comprises pluralities of metal coils 7', 7", of the dimensions of around two square centimeters, arrange on backing films (Mylar, etc.) adapted to allow the application thereof to wearable objects 5, according to criteria of ergonomics and ease of use required for the same objects.

Said coils 7' of said antenna 3 allow the transmission of signals in RFID or NFC standard, generated by the microchip 2', in encrypted form, and the reception of signals in the same standards, generated by Readers R of RFID or NFC systems.

Said coils 7" of said antenna 3 instead allow power to be supplied to the microchip 2' and the components of the device 1 correlated thereto, via electromagnetic induction generated by interaction of the same antenna 3 with corresponding transmission/reception A antennas of Readers R of RFID or NFC systems.

The transmission/reception functions of signals in RFID or NFC standards and of power supplied via electromagnetic induction can be performed both by the coils of a single antenna 3 or by the coils of several antennas 3 individually designated to these functions.

The reversible closing buckle 6 of the wearable object 5 is associated with the opposite ends of the coils 7', 7" of said antenna 3, so as to cause a point of discontinuity thereof capable of reversibly interrupting said transmission/reception functions of signals in RFID or NFC standard and of power supply of the microchip 2' and of the components of the device 1 correlated thereto.

Operation of a wearable device 1 with integrated RFID or NFC chipset according to the invention can be summed up as described below.

The user puts on the object 5, produced in the form of bracelets, watches, necklaces, belts, etc., and closes the related buckle 6.

The user activates the microchip 2' integrated in said object 5, via personal identification codes and encryption keys, transmitted via a multiplatform software application, executed on a portable or fixed electronic device, physically or remotely connected to the device 1.

Via said multiplatform software application, executed on said portable or fixed electronic device, the user then enters personal data usable in RFID or NFC systems in the memory chip 4, also integrated in said object 5.

With the microchip 2' activated and the buckle 6 closed, the device 1 is able to operate as a passive Tag and consequently to transmit the data and the encryption keys of the same, contained in the memory chip 4, to a Reader R of an RFID or NFC system, as consequence of the interrogation received by the device 1 from the same Reader R.

The sequence of events deriving from interrogation of the device 1 by the Reader R of an RFID or NFC system is as follows:

the control logic L of the Reader R sends the interrogation data to a transmitter T that generates the signal for a coil antenna A;

the electrical current circulating in the coil antenna A of the Reader R induces a pulsating magnetic field that concatenates with the coil antenna 3 of the microchip 2' integrated in the object 5 worn by the user;

a rectifier/limiter circuit 8 obtains from the antenna 3 the electric current required for operation of the microchip 2' and of the components of the device 1 correlated thereto.

a circuit for indicating the availability of electric current 9 enables operation of the microchip 2' and of the components of the device 1 correlated thereto;

a detector/decoder circuit 10 supplies the microchip 2' with data received from the Reader R;

said detector/decoder circuit 10 signals to a modulator 11 the instants in which it is possible to activate transmission of the data and the encryption keys of the same, contained in the memory chip 4, toward the Reader R;

the microchip 2' reads the data and the encryption keys of the same, contained in the memory chip 4, causes encryption of said data according to said encryption keys, and indicates the availability thereof, together with said encryption keys, to said modulator 11, which, in the appropriate instants, generates a pilot signal through suitable modulation of the impedance of the antenna 3;

the Reader R perceives the variations of the impedance of the antenna 3 via a detector RL, obtains from said variations the data received, and sends them toward its control logic L.

The device 1 implements in particular an encryption system that, using algorithms normally used for communications in RFID or NFC standard, is capable of causing, at hardware level, physical separation of the encryption algorithms, contained in the microchip 2', from the encryption keys, contained in the memory chip 4.

With the microchip 2' activated, opening of the buckle 6 of the object 5 worn by the user causes a point of discontinuity in the coils 7', 7" of the antenna 3 associated with the same microchip 2'.

Said point of discontinuity causes interruption of the coils 7' of the antenna 3, designated to transmission/reception of signals in RFID or NFC standard, reducing the area thereof to zero, and consequently prevents the generation of communications in these standards, normally managed, in encrypted form, by the microchip 2'.

Said point of discontinuity also causes short-circuiting of the coils 7" of the antenna 3, designated to the power supply of the microchip 2' and of the components correlated thereto, bringing the area thereof to approximately zero, and consequently inhibits the communication functions, in RFID or NFC standard, normally supplied, in encrypted form, by said microchip 2'.

Moreover, opening of the buckle 6 of the object 5 is detected by the microchip 2" associated thereto, which:

generates and transmits to the microchip 2' control signals adapted to cause the temporary deactivation thereof;

generates and transmits to the memory chip 4 control signals adapted to cause deletion of the data and of the encryption keys contained therein.

The microchip 2" is associated with power supply means 12, of the type of storage capacitors, femtocells or the like.

Said means 12 allow regular operation of the microchip 2", after short-circuiting of the coils 7" of the antenna 3 of the device 1, solely for the time required to complete the aforesaid procedures of deactivation of the microchip 2' and of deletion of the memory chip 4.

Advantageously, if opening of the buckle 6 of the object 5 worn by the user were the result of malicious removal of the device 1, the device be unable to transmit the data and the encryption keys of the same, contained in the memory chip 4, in response to the interrogation of a Reader R of an RFID or NFC system, in this way preventing interception of the data transmitted and possible use thereof in actions of fraudulent access to goods and services belonging to others.

Just as advantageously, after opening of the buckle 6 of the wearable object 5, the related microchip 2' will require a new preliminary activation, via identification codes and encryption keys in possession of the legitimate user of the device 1, in this way preventing its use by unauthorized users.

Considering the high levels of security provided, a wearable device with RFID or NFC chipset according to the invention will find its natural application within the scope of services that require the communication of highly personal data, such as systems for electronic banking or for the electronic purchase of goods and services.

The invention claimed is:

1. A wearable device (1) with integrated RFID or NFC chipset, comprising:
    a first microchip (2') for management and encryption of radio-frequency communications in RFID or NFC standards;
    at least one antenna (3) associated with said first microchip (2'), comprising a first metal coil and a second metal coil, the first metal coil (7') adapted to transmit/receive signals in RFID or NFC standards and the second metal coil (7") adapted to generate via electromagnetic induction an electric current required for operation of said device (1);
    a memory chip (4), adapted to contain data and encryption keys of the data, manageable by the first microchip (2');
    a wearable object (5), integrating at least the first microchip, the at least one antenna, and the memory chip;
    a reversible closing buckle (6) for said wearable object (5), associated with opposite ends of said first and second metal coils (7', 7") of said antenna (3); and
    a second microchip (2") associated with said reversible buckle (6) of the wearable object (5), adapted to detect an open state of the reversible buckle (6),
    wherein an opening of said buckle (6) is adapted to determine in said first and second metal coils (7', 7") of said antenna (3) a point of discontinuity that reversibly inhibits transmission/reception functions and electromagnetic induction functions of said first and second metal coils (7', 7"), respectively, and
    wherein said second microchip (2") is adapted to cause deactivation of said first microchip (2') and simultaneous deletion of the data and of the encryption keys contained in said memory chip (4) after the buckle (6) has been opened, so as to prevent unauthorized transmission by said first microchip (2') of the data and of the encryption keys contained in said memory chip (4).

2. The device (1) according to claim 1, wherein the first microchip (2') comprises receiving means of identification codes and encryption keys, for preliminary activation, transmitted via software applications executed by portable or fixed electronic devices, connected physically or remotely to the device (1).

3. The device (1) according to claim 1, wherein the wearable object (5) is any of a bracelet, watch, and belt.

4. The device (1) according to claim 1, further comprising:
    power supply means (12) associated with said second microchip (2"), adapted to allow operation of the second microchip (2") for time required to deactivate the first microchip (2') and to delete the data and the encryption keys contained in said memory chip (4).

5. The device (1) according to claim 1, further comprising:
    support films for said first and second coils (7', 7") of the antenna (3) adapted to allow application thereof to said wearable object (5).

6. The device (1) according to claim 1, further comprising:
    a rectifier/limiter circuit (8) adapted to obtain from the antenna (3) the electric current required for operation of the first microchip (2').

7. The device (1) according to claim 1, further comprising:
    a circuit for indicating an availability of electric current (9), adapted to enable operation of the device (1).

8. The device (1) according to claim 1, further comprising:
    a detector/decoder circuit (10) adapted to supply the first microchip (2') with data received from a Reader (R) of an RFID or NFC system and to signal to a modulator (11) instants in which to transmit the data and the encryption keys contained in the memory chip (4) toward said Reader (R) of said RFID or NFC system, via said first microchip (2').

9. The device (1) according to claim 1, further comprising:
    a modulator (11) of an impedance of the antenna (3), adapted to generate a pilot signal for transmission of the data and of the encryption keys contained in the memory chip (4) toward a Reader (R) of an RFID or NFC system.

* * * * *